United States Patent
Fleury et al.

(10) Patent No.: US 6,910,351 B2
(45) Date of Patent: Jun. 28, 2005

(54) METHOD OF FABRICATING AN OPTICAL FIBER WITH CONTROLLED TRANSMISSION CHARACTERISTICS

(75) Inventors: Ludovic Fleury, Bois d'Arcy (FR); Louis-Anne de Montmorillon, Paris (FR); Pierre Sillard, Le Chesnay (FR); Pascale Nouchi, Maisons Laffitte (FR); Max Matau, Conflans Sainte Honorine (FR)

(73) Assignee: Alcatel, Paris (FR)

( * ) Notice: Subject to any disclaimer, the term of this patent is extended or adjusted under 35 U.S.C. 154(b) by 455 days.

(21) Appl. No.: 09/852,651

(22) Filed: May 11, 2001

(65) Prior Publication Data

US 2002/0002845 A1 Jan. 10, 2002

(30) Foreign Application Priority Data

May 25, 2000 (FR) .......................................... 00 06694

(51) Int. Cl.$^7$ ......................... C03B 37/02; C03B 37/07
(52) U.S. Cl. ............................... 65/382; 65/378; 65/435
(58) Field of Search .............................. 65/377–9, 385, 65/415, 435, 381–2, 484–5, 491, DIG. 13; 385/123–8

(56) References Cited

U.S. PATENT DOCUMENTS

| | | | | | |
|---|---|---|---|---|---|
| 4,102,661 A | * | 7/1978 | Dudderar et al. | .............. | 35/378 |
| 4,294,601 A | * | 10/1981 | Dabby et al. | .................. | 65/378 |
| 4,362,943 A | * | 12/1982 | Presby | ..................... | 250/459.1 |
| 4,406,518 A | * | 9/1983 | Matsumura et al. | ......... | 385/124 |
| 4,793,840 A | * | 12/1988 | Harding | ......................... | 65/381 |
| 6,131,414 A | * | 10/2000 | Shimizu et al. | ................ | 65/378 |
| 6,502,429 B1 | * | 1/2003 | Abe | .............................. | 65/382 |
| 6,553,790 B1 | * | 4/2003 | Fleming et al. | ................ | 65/382 |

FOREIGN PATENT DOCUMENTS

| | | |
|---|---|---|
| EP | 0 035 237 A | 9/1981 |
| EP | 0 518 749 A2 | 12/1992 |
| GB | 2 074 723 A | 11/1981 |
| GB | 2238536 | * 6/1991 ......... C03B/37/022 |
| WO | WO 99/54763 | 10/1999 |

OTHER PUBLICATIONS

J. Braun et al, "Multimikrorechner–Steuerungssystem zur Anwendun in der Lichtwellenleiter–Technologie" Nachrichtentechnik Elektronik, vol. 35, No. 4, 1985, pp. 154–155, XP002157637.
Patent Abstracts of Japan, vol. 1988, No. 6, Apr. 30, 1998 corresponding to JP 10 045421 A (Sumitomo Electric Ind.) dated Feb. 17, 1998.
Patent Abstracts of Japan, vol. 18, No. 601, Nov. 16, 1994 corresponding to JP 06 227838 A (Furukawa Electric Co. Ltd.) dated Aug. 16, 1994.
Patent Abstracts of Japan, vol. 17, No. 591, Oct. 28, 1993, corresponding to JP 05 178634 A (Fujikura Ltd.) dated Jul. 20, 1993.
Patent Abstracts of Japan, vol. 12, No. 467, Dec. 7, 1988 corresponding to JP 63 185839 A (NT&T Corp.) dated Aug. 1, 1988.
Patent Abstracts of Japan, vol. 9, No. 145, Jun. 20, 1985 corresponding to JP 60 027616 A (Santetsuku Co., Ltd.), dated Feb. 12, 1985.
Patent Abstracts of Japan, vol. 12, No. 316, Aug. 26, 1988 corresponding to JP 63 085021 A (Hitachi Cable Ltd.) dated Apr. 15, 1988.

* cited by examiner

*Primary Examiner*—Eric Hug
(74) *Attorney, Agent, or Firm*—Sughrue Mion, PLLC

(57) ABSTRACT

The invention relates to a method of fabricating an optical fiber with improved control of transmission characteristics. It proposes determining variations in the characteristics of the preform departing from the design characteristics and modifying the diameter of the fiber during drawing as a function of the measured variations. By varying the diameter of the fiber, variations in the preform departing from its design values can be compensated, in other words irregularities of the preform can be smoothed out. This variation limits the effect of preform variations on the propagation characteristics of the fiber.

8 Claims, No Drawings

METHOD OF FABRICATING AN OPTICAL FIBER WITH CONTROLLED TRANSMISSION CHARACTERISTICS

The invention relates to optical fibers used in telecommunications networks in particular, and more precisely it relates to fabricating optical fibers.

BACKGROUND OF THE INVENTION

In the art of fabricating optical fibers, it is known to fabricate preforms whose doping is varied in the radial direction as a function of the required index profile in the fiber, and then to draw the preform to obtain the optical fiber. One conventional preform fabrication method consists of successively depositing layers of silica by modified chemical vapor deposition (MCVD) into a deposit tube to form a preform core and then to form a sleeve around the deposit tube; the sleeve is generally deposited onto the preform in such a way that the outside diameter of the preform is constant. Other fabrication techniques include outside vapor deposition (OVD) and vapor axial deposition (VAD). The resulting preform is then drawn.

For applications in optical transmission systems it is desirable for the propagation characteristics of the fiber, for example its chromatic dispersion, to be closely controlled along the fiber. Dispersion can be kept constant or it can be varied in a controlled manner between two opposite values, as proposed for example in EP-A-0 737 873. The propagation characteristics are a function of the index profile of the fiber, characterized by the refractive indices and radii of the layers deposited by MCVD, OVD, or VAD. Despite the great care taken in fabricating the preform, it is possible for the preform to suffer from defects and to be less than perfectly homogeneous, or more generally not to conform perfectly to its design values.

Generally speaking, the expression "core radius of a fiber" means the value of the radius beyond which variations in the index or the radius relative to its design value has minimal influence on the propagation characteristics of the fiber. In other words, it refers to the outer limit of the profile which defines the propagation characteristics of the fiber. For example, for a "stepped index" profile, the core radius is the outside radius of the index step. For a trapezium and ring profile the core radius is the outside radius of the ring. The above definition is transposed to a preform on the principle of geometrical scaling. It is important to note that the core radius of a preform defined in this way can be significantly different from the inside radius of the deposit tube.

Examples of the above defects are variations along the preform departing from respective nominal values, in the diameter of the core of the preform, in the radii of the deposited layers, or in the outside diameter of the preform. The defects can also be variations along the preform in the indices of the various layers of the preform departing from their design indices. For example, a 1% to 2% radial increase in the diameter of the core of the preform for a flat chromatic dispersion slope fiber can cause variations in chromatic dispersion of 1 picosecond per nanometer-kilometer (ps/(nm.km)) to 2 ps/(nm.km) at 1550 nm; such variations reduce the production yield. For dispersion compensated fibers (DCF) and reverse dispersion fibers (RDF) the variations in the characteristics of the preform can induce variations in dispersion of up to 10 ps/(nm.km) at 1550 nm.

WO-A-98 25 861 describes a fiber for soliton transmission applications, in which the outside diameter of the fiber varies. It states that dispersion varies with the diameter of the fiber. In a first embodiment proposed in that document a preform is formed by depositing layers having thickness that increases from one end of the preform to the other. The resulting conical core of the preform is surrounded with its cladding before the fiber is drawn. In a second embodiment described in the document a preform is formed by depositing layers of constant thickness but with the proportions of dopant varying. In either case, drawing the preform produces a fiber of constant diameter whose propagation characteristics vary as a function of position along the fiber.

OBJECTS AND SUMMARY OF THE INVENTION

The invention proposes a solution to the problem of controlling the propagation characteristics of an optical fiber caused by variations in the characteristics of the preform departing from its design characteristics. It enables preform defects or irregularities to be corrected finely, thereby enabling fibers to be obtained with improved control over their propagation characteristics. It is also simple to put into practice.

To be more precise, the invention proposes a method of fabricating an optical fiber by drawing a preform, the method including:
  determining variations in the characteristics of the preform departing from its design characteristics, and
  modifying the diameter of the fiber during drawing as a function of said variations to compensate the effect of said variations on the propagation characteristics of the fiber.

The diameter of the fiber is preferably modified to compensate the effect of said variations on the propagation characteristics of the fiber In one implementation, the preform has constant outside diameter and the determination step includes measuring the diameter of the core of the preform. In this case, the diameter of the fiber is modified so that the relative variation in said diameter is in the opposite direction to the relative variation in the diameter of the core of the preform.

In another embodiment the characteristics are geometrical characteristics such as the diameter of the preform, the radii of the layers of the preform or the diameter of the core of the preform. The characteristics can instead or also be optical characteristics such as the indices of the various layers of the preform.

The modifications to the diameter of the fiber are preferably less than a predetermined limit value, for example less than 2 micrometers ($\mu$m) or less than ±2% of the nominal diameter of the fiber.

The invention also provides an optical fiber obtained by the above method.

DETAILED DESCRIPTION OF THE INVENTION

Other features and advantages of the invention will become apparent on reading the following description of embodiments of the invention, which is given by way of example only.

To compensate variations in the characteristics of the preform departing from their design values, the invention proposes to vary the diameter of the fiber during drawing. Varying the diameter of the fiber compensates all or some of the variations in the characteristics of the preform departing from their design values. The invention is based on the observation that limited variations (typically in the range ±1% to ±2%) in the diameter of the fiber compensate defects in terms of the homogeneity or regularity of the preform and do not cause any problems from the point of view of subsequent propagation in the fiber.

Modifying the diameter of the fiber while drawing the preform re-centers the propagation characteristics in their specific ranges provided that the geometrical characteristics (the diameter of the core of the preform, the radii of the deposited layers, or the outside diameter of the preform) or the optical characteristics (for example the indices of the various layers of the preform) diverge from their design values.

How the diameter is varied during drawing depends on the preform and to be more precise on the characteristics of the preform, for example the core radius, the radii of the deposited layers, the outside radius of the preform or the indices within the preform. These characteristics can be measured on a preform on a measurement bench and using techniques known in the art. For example, the refractive index profile of the preform can be measured on a Photo-Kinetics P104 measurement bench.

The outside diameter and the core diameter of the preform can be measured, for example. If necessary, the whole of the index profile of the preform can be measured. The measurement increment along the preform can be a few centimeters; for conventional methods of fabricating the preform, variations along the preform in the core diameter or in other characteristics departing from their nominal values are small; the above measurement increment can be sufficient to identify variations in the characteristics of the preform departing from their design value.

Before drawing, and using conventional simulation tools on measured geometrical or optical characteristics of the preform, it is possible to determine the propagation characteristics of the fiber corresponding to the various sections of the preform and for different drawing diameters. For example, the geometrical or optical characteristics of the preform that are measured can be the core diameter of the fiber and the optical characteristics (the indices and the diameters of the sections deposited by CVD) of the various parts of the preform.

The invention proposes to vary the outside diameter of the fiber to control the propagation characteristics in the fiber. For conventional drawing, fiber diameter can be varied during drawing in two ways:

by modifying the speed of the drawing capstan, or by modifying the rate of descent of the preform.

The first method varies the diameter of the fiber quickly; varying the speed of the capstan typically modifies the diameter of the fiber by approximately 2% over a length of fiber of the order of one meter (m) at a drawing speed of 200 meters per minute (m/min) to 2000 m/min, and is very suitable for varying the fiber diameter over small distances. The second method varies the fiber diameter more slowly, and means that a constant drawing speed (capstan speed) can be maintained. A fiber diameter variation of approximately 2% is typically obtained over a fiber length of approximately 6 kilometers (km).

The two methods can be combined; thus, it might be sufficient to modify the rate of descent of the preform to compensate the measured variations; however, it is also possible to act directly on the speed of the drawing capstan, to obtain faster control, and then to modify the rate of descent of the preform while returning to the original drawing speed. This has the advantage of a fast response to variations combined with maintaining the normal drawing speed as far as possible.

For a stepped index profile, for example, consider the situation in which measurements on the preform indicate that the ratio r between the core diameter of the preform (as defined above) and the outside diameter of the preform is greater than the design ratio, other things remaining equal. In this case, for a constant nominal outside diameter of the fiber, the fiber core diameter is greater than the design diameter; this increases the chromatic dispersion of the fiber relative to the design value. The invention therefore proposes to reduce the outside diameter of the fiber in this situation; the diameter of the fiber core is also reduced, and approaches the design value. In this case reducing the outside diameter of the fiber compensates the variation in the ratio r departing from its nominal value, the other characteristics of the preform, and in particular its optical characteristics, conforming to their design values.

Conversely, if the measurements on the preform reveal that the ratio between the core diameter of the preform and the outside diameter of the preform is less than the design ratio, the invention proposes increasing the outside diameter of the fiber to compensate the influence on the propagation characteristics of the fiber of the geometrical variations in the preform departing from its design values.

In the example described above, simulation tools are used to evaluate the effect of variations in the preform. Measurements on preforms and corresponding real fibers could also be used for this purpose, and could constitute a database associating the characteristics of a preform with the characteristics of the resulting fiber. More generally, any solution can be used that associates characteristics of the fiber with variations in the characteristics in the preform departing from design values in order to calculate the variations to be applied to the fiber diameter when drawing the preform.

In the simplest case, for a preform of constant outside diameter, fiber diameter varies relative to its design value in the opposite direction to variation in the preform core diameter relative to its design value. The fiber core diameter therefore remains constant or substantially constant.

More generally, variations in the outside diameter of the fiber can be determined so that the diameter of the fiber core tends towards a value that compensates as far as possible for variations in all of the geometrical or optical characteristics of the preform relative to design characteristics.

If the characteristics of the preform are measured discretely, the diameter of the fiber can be varied discretely. Thus, for a measurement pitch of a few centimeters (cm), it is possible to calculate diameter values of the fiber in drawing ranges corresponding to a few centimeters of the preform on either side of the measurement points. The fiber diameter is then varied as a function of the diameters calculated for these discrete points, using linear or polynomial interpolation.

Moreover, the invention also proposes to limit the variations in the outside diameter of the fiber; for a nominal diameter of 125 $\mu$m, it proposes a maximum diameter variation of ±2 $\mu$m, or a relative variation of ±2%. Limiting variations in the diameter of the fiber limits variations in the propagation characteristics and prevents diameter variations having a more harmful effect than departures from the design values induced by the preform. This limit also ensures that the outside diameter remains within the geometrical specifications of the fiber.

Implementations of the invention are described below in the case of a DCF whose propagation characteristics at 1550 nm are as follows:

chromatic dispersion C: −75 ps/(nm.km),
chromatic dispersion slope C': −0.5 ps/(nm².km),
effective cross-section: 20 μm²,
$2W_{02}$ mode diameter: 5 μm.

The fiber has a step+ring profile with a nominal core diameter of 15 μm; the preform required has a similar profile. The example considers variations in the core radius A of the preform and in the index Δn of the step.

A first example considers only variations in the core radius A of the preform, with the index profile remaining geometrically similar to the nominal index profile; this variation is given in the first column of the table. In accordance with the invention, it leads to a variation in the fiber diameter of opposite sign.

In the table, the column headed "Δfiber" gives the fiber core variation as a percentage. If the invention is not used, for a ±2% variation of the core radius A, the effective section area varies over the range 19.2 μm² to 22.3 μm². By controlling the diameter of the fiber in accordance with the invention, within limits of approximately ±2%, all the propagation characteristics can be maintained at their nominal values. The table shows how the propagation characteristics vary when the invention is used. In each case, Δbf and Δaf are respectively the relative departure of the parameter concerned from its nominal value when the invention is not used (with no fiber diameter correction) and when the invention is used (with fiber diameter correction).

The values in the table show that the invention effectively compensates variation in the effective section area $S_{eff}$, in the chromatic dispersion C, and in the chromatic dispersion slope C'.

|  | $\Delta_{fiber}$ (%) | $S_{eff}$ (μm²) | | C (ps/nm · km) | | C' (ps/nm² · km) | |
| --- | --- | --- | --- | --- | --- | --- | --- |
|  |  | Δbf (%) | Δaf (%) | Δbf (%) | Δaf (%) | Δbf (%) | Δaf (%) |
| A varies by +2% | −2 | −4 | 0 | +22.6 | 0 | +18 | 0 |
| A varies by −2% | +2 | +12.5 | 0 | −31 | 0 | −19.4 | 0 |

A second example considers only variations in the index Δn of the core of the preform, with all the other parameters fixed. It considers a variation in the fiber diameter such that the effective section area is maintained constant to within ±0.1%. The results obtained are set out in the table below, using the same notation as before.

|  | $\Delta_{fiber}$ (%) | $S_{eff}$ (μm²) | | C (ps/nm · km) | | C' (ps/nm² · km) | |
| --- | --- | --- | --- | --- | --- | --- | --- |
|  |  | Δbf (%) | Δaf (%) | Δbf (%) | Δaf (%) | Δbf (%) | Δaf (%) |
| A varies by +2% | −1.8 | −5.4 | 0 | +14 | −9 | +13 | −5.6 |
| A varies by −2% | +2 | +8 | 0 | −20.6 | +7.5 | −21 | −1 |

This table shows that variation in the fiber diameter is of opposite sign to variation in the core index. It also shows that the invention maintains the effective section area constant, although this is achieved at the cost of variations in the chromatic dispersion and in the chromatic dispersion slope; however, those variations are significantly smaller than the corresponding variations if the invention is not used.

A third example considers only variations in the index Δn of the core of the preform, with all the other parameters fixed. It considers a variation in the fiber diameter that maintains the chromatic dispersion constant to within ±0.1%. The results obtained are set out in the table below, which uses the same notation as before.

|  | $\Delta_{fiber}$ (%) | $S_{eff}$ (μm²) | | C (ps/nm · km) | | C' (ps/nm² · km) | |
| --- | --- | --- | --- | --- | --- | --- | --- |
|  |  | Δbf (%) | Δaf (%) | Δbf (%) | Δaf (%) | Δbf (%) | Δaf (%) |
| A varies by +2% | −1.15 | −5.4 | −2.4 | +14 | 0 | +13 | +1 |
| A varies by −2% | +1.45 | +8 | +1.6 | −20.6 | 0 | −21 | −7.6 |

This table shows that variations in the fiber diameter are of opposite sign to variations in the core index. It also shows that the invention maintains the chromatic dispersion constant to within the required limits; as in the previous example, the other propagation parameters (the effective section area and the chromatic dispersion slope) vary; however, these variations are significantly smaller than the corresponding variations if the invention is not used.

A fourth example considers only variations in the index Δn of the core of the preform, with all the other parameters fixed. It considers a variation in the fiber diameter to maintain the chromatic dispersion slope constant to within ±0.1%. The results obtained are set out in the table below, which uses the same notation as before.

|  |  | $S_{eff}$ ($\mu m^2$) | | C (ps/nm · km) | | C' (ps/nm$^2$ · km) | |
| --- | --- | --- | --- | --- | --- | --- | --- |
|  | $\Delta_{fiber}$ (%) | Δbf (%) | Δaf (%) | Δbf (%) | Δaf (%) | Δbf (%) | Δaf (%) |
| A varies by +2% | −1.25 | −5.4 | −2 | +14 | −1 | +13 | 0 |
| A varies by −2% | +2.1 | +8 | −0.7 | −20.6 | +7.5 | −21 | 0 |

This table shows again that variations in the fiber diameter are of opposite sign to variations in the core index. It also shows that the invention maintains the chromatic dispersion slope constant to within the required limits; as in the previous two examples, the other propagation parameters (the effective section area and the chromatic dispersion) vary; once again, these variations are significantly smaller than the corresponding variations if the invention is not used.

A fifth example considers again variations in the index Δn of the core of the preform, with all the other parameters fixed. This example seeks to maintain the effective section area within ±1% of the nominal value. Accepting greater variations in the effective section area further limits variations in the chromatic dispersion and the chromatic dispersion slope compared to the second example. The results obtained are set out in the table below, which uses the same notation as before.

|  |  | $S_{eff}$ ($\mu m^2$) | | C (ps/nm · km) | | C' (ps/nm$^2$ · km) | |
| --- | --- | --- | --- | --- | --- | --- | --- |
|  | $\Delta_{fiber}$ (%) | Δbf (%) | Δaf (%) | Δbf (%) | Δaf (%) | Δbf (%) | Δaf (%) |
| A varies by +2% | −1.6 | −5.4 | −1 | +14 | −6 | +13 | −3.4 |
| A varies by −2% | +1.6 | +8 | +1 | −20.6 | +2.3 | −21 | −6 |

This table shows that variation in the fiber diameter is of opposite sign to variation in the core index. It also shows that the invention limits variations in the effective section area, chromatic dispersion, and chromatic dispersion slope.

The above examples are representative of various fiber optimization strategies. Other strategies are feasible, depending on the pertinent propagation parameters. The following strategies in particular could be considered:

determining drawing diameter corrections from measurements on the preform core; this assumes that the outside diameter of the preform is constant and ignores index variations and variations between the ratios of the radii of the deposited layers as far out as the core radius of the preform, it being assumed that the profile is merely enlarged;

determining drawing diameter corrections from geometrical data of the profile, by measurements on the preform core and measuring the radii of the deposited layers; this assumes that the outside diameter of the preform is constant;

determining drawing diameter corrections from geometrical data of the profile, measurements on the preform core, measuring the radii of the deposited layers, and measuring the outside diameter of the preform; and determining drawing diameter corrections from geometrical and optical data of the profile, measurements on the preform core, measuring the radii of the deposited layers, measuring the outside diameter of the preform and measuring the indices of the various deposited layers.

The examples also do not consider simultaneous variations in the core diameter and the core index. In practice, if the radius and index of the core both diverge from their nominal value, an optimum solution can be attempted that aims to re-center the three propagation characteristics in the specified ranges as much as possible.

Finally, and very generally, variations in more than one parameter of the index profile can be envisaged. There is an optimum solution, of the same kind as the solution proposed in the fifth example, which aims to re-center the propagation characteristics in given specified ranges as much as possible. The optimum solution is determined as explained above, for example by simulation.

Of course, the present invention is not limited to the examples and implementations described and tabulated, many variants of which will suggest themselves to the skilled person. The variations in the fiber diameter can be determined by methods other than those described hereinabove. Characteristics other than geometrical characteristics can also be considered, and in particular optical characteristics.

The implementations of the invention described above relate to an application in which the effective section area, the chromatic dispersion, or the chromatic dispersion slope remains constant. The invention applies more generally to compensating the effects on the characteristics of the fiber of variations in the characteristics of the preform departing from their design values, and compensates those effects whether they are constant or not. Thus the invention could also apply to the preforms with decreasing chromatic dispersion values described in WO-A-98 25 861 or to the preforms with discrete and alternating chromatic dispersion values described in EP-A-0 737 873. In all cases, the invention controls the propagation characteristics of the fiber relative to the required propagation characteristics.

What is claimed is:

1. A method of fabricating an optical fiber by drawing a preform, the method comprising:

determining variations in optical or geometric characteristics of the preform departing from intended design characteristics of the preform prior to heating the preform for drawing the optical fiber, and modifying a diameter of the optical fiber during drawing as a function of said determined variations to compensate the effect of said variations on propagation characteristics of the optical fiber.

2. The method of claim 1, wherein the preform has a constant outside diameter and the step of determining said variations includes measuring the diameter of core of the preform.

3. The method of claim 2, wherein the diameter of the optical fiber is modified so that a relative variation in said diameter is in a direction opposite to a relative variation in the diameter of the core of the preform.

4. The method of claim 1, wherein said geometrical characteristics include a diameter of the preform, radii of the layers of the preform or a diameter of a core of preform.

5. The method of claim 1, wherein said optical characteristics include indices of layers of the preform.

6. The method of claim 1, wherein modifications to the diameter of the optical fiber are less than a predetermined limit value.

7. The method of claim 6, wherein the modifications to the diameter of the optical fiber are less than 2 $\mu$m.

8. The method of claim 1, wherein the modifications to the diameter of the optical fiber are less than +2% of the nominal diameter of the fiber.

* * * * *